(12) United States Patent
Webjorn

(10) Patent No.: US 8,172,279 B2
(45) Date of Patent: May 8, 2012

(54) METHOD FOR MANUFACTURING A FLANGED ELEMENT AND A FLANGED ELEMENT

(75) Inventor: Mats Webjorn, Spanga (SE)

(73) Assignee: Verax Engineering AB (SE)

( * ) Notice: Subject to any disclaimer, the term of this patent is extended or adjusted under 35 U.S.C. 154(b) by 1200 days.

(21) Appl. No.: 10/472,422

(22) PCT Filed: Mar. 19, 2002

(86) PCT No.: PCT/SE02/00545
§ 371 (c)(1),
(2), (4) Date: Sep. 19, 2003

(87) PCT Pub. No.: WO02/075196
PCT Pub. Date: Sep. 26, 2002

(65) Prior Publication Data
US 2004/0080162 A1    Apr. 29, 2004

(30) Foreign Application Priority Data

Mar. 19, 2001 (SE) ...................................... 0100942

(51) Int. Cl.
*F16L 23/00* (2006.01)
(52) U.S. Cl. .......................................... 285/412; 29/557
(58) Field of Classification Search .................. 285/412, 285/368; 29/890.14, 557
See application file for complete search history.

(56) References Cited

U.S. PATENT DOCUMENTS

| 3,387,867 | A | * | 6/1968 | Rogers | 285/368 |
| 4,183,562 | A |   | 1/1980 | Watkins et al. | 285/405 |
| 4,288,105 | A | * | 9/1981 | Press | 285/368 |
| 4,428,603 | A | * | 1/1984 | Davlin | 285/368 |
| 4,620,731 | A | * | 11/1986 | Rushing | 285/368 |
| 5,197,766 | A | * | 3/1993 | Glover et al. | 285/368 |
| 5,230,540 | A | * | 7/1993 | Lewis et al. | 285/363 |
| 6,361,085 | B2 | * | 3/2002 | Nguyen | 285/368 |

FOREIGN PATENT DOCUMENTS

| DE | 2 854 054 | 7/1980 |
| GB | 1 559 388 | 1/1980 |
| NO | 177160 | 4/1995 |

* cited by examiner

*Primary Examiner* — David E Bochna
(74) *Attorney, Agent, or Firm* — Ostrolenk Faber LLP

(57) ABSTRACT

A flanged member for a pipe system, and a method of manufacturing same. The flanged member has a radially projecting flange part and a pipe part. The flange part has a front end surface connects to another flange part, and a radially planar rear end surface facing the pipe part which delimits the rear end of the flange part against the pipe part, together with a radially inward extension of the rear end surface. The pipe part has a free end, adapted to be welded into the pipe system. Before final machining of the front surface of the flange part, the pipe part has an axial length such that its mass is at least 35% of the mass of the flange part so that upon welding of the free end of the pipe part, there is substantially no distortion of the rear surface of the flange part.

17 Claims, 1 Drawing Sheet

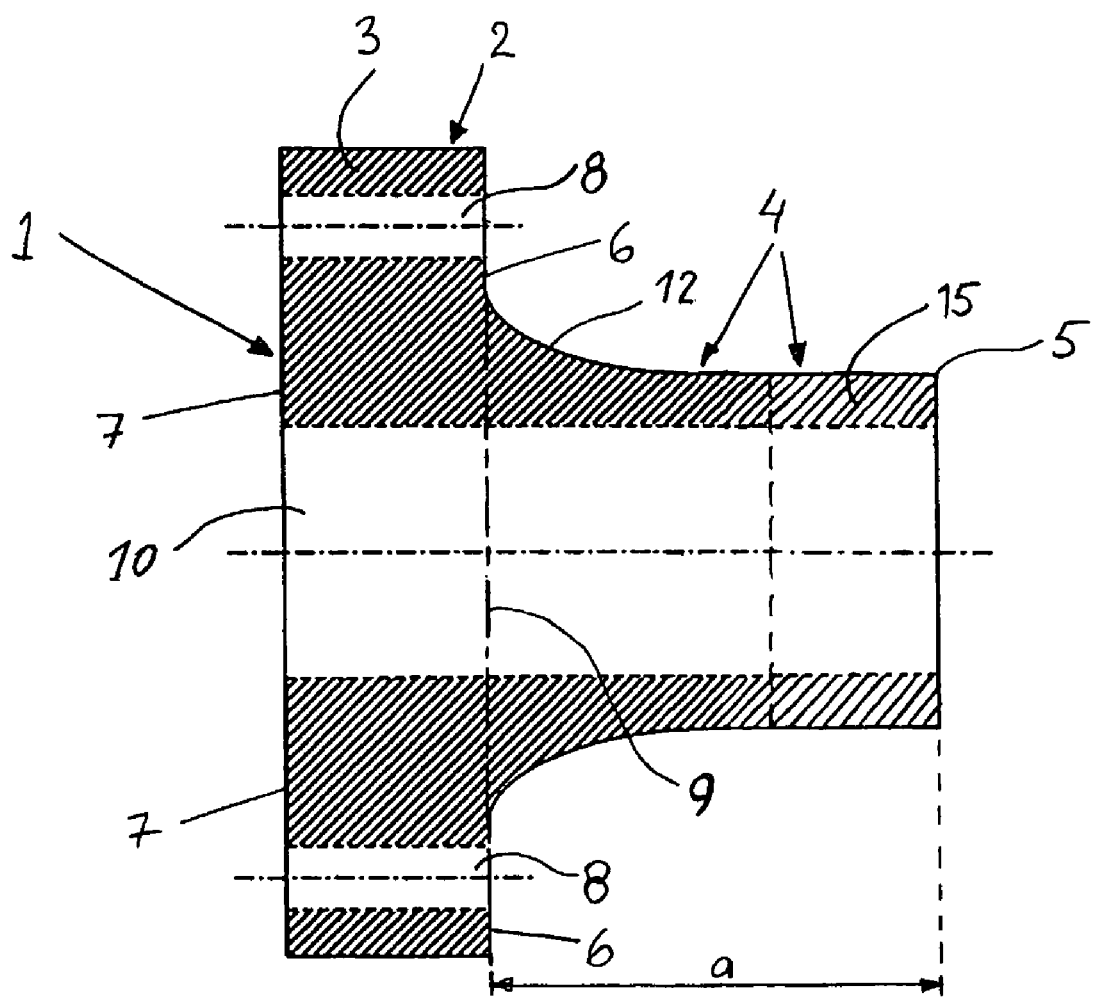

METHOD FOR MANUFACTURING A FLANGED ELEMENT AND A FLANGED ELEMENT

BACKGROUND OF THE INVENTION

The present invention relates to a method for the manufacture of a flanged member for a pipe system and to a flanged member intended for use in a pipe system.

It has been known for a long time to join various parts and components for pressure equipment, especially in pipe systems, by using flanged members, usually called flanged pipe joints. By flanged member, also named flange member or merely flange, is here intended a pipe element having a ring-shaped collar or flange at one of its ends. So-called flanged pipe joints include two flanged members that are bolted together, and they are used, for instance, for the joining of pipes in numerous applications. A flanged member is then attached to one end of a pipe, usually by welding. Also an opposite piece of pipe is provided with a flanged member, and the flanged pipe joint is achieved by bolting those two flanged members together. Flanged members are also used for the connection of a piece of pipe to different components included in a pipe system, as for instance valves, a Y-piece or just another piece of pipe. In such a case a flanged member is attached to the free end of the pipe and then bolted to a corresponding and for this purpose adapted part of the valve. Also, other types of joint arrangements may be used, for instance joints of clamp or hoop type.

Flanged joints and other joints, where flanged members are incorporated, are used in numerous applications. It follows, that the actual dimensions of these pipes and flanged members may vary substantially. Regarding large size pipe, as for an example with applications within the offshore-, subsea-, process- and petroleum-industries and also in nuclear power plants, flanged joints and flanged members of traditional design, are characterised by considerable weight, large bulk and high cost. However, a special type of flanged joint/flanged member is known, a so called compact flange system, in which certain dimensioning principles are applied such that the flanges can be made substantially smaller than by using conventional design. The invention in the present case is particularly well suited for this type of compact flanges, although it is not limited to such.

As the flanged member normally is very bulky and consequently is a much more expensive component than a straight piece of pipe, an effort is usually made to make the flanged member as short as possible, in order to limit the need for space and the cost of material. In practice this means that its non-flanged end is made as short as possible. In cases with pipes having a relatively large outside diameter and consequently a large flange diameter, and at the same time a comparatively small wall-thickness, it will occur, during welding of the non-flanged end of the flanged member to a pipe element in the pipe system, such high heat transfer in the flanged member that the contact surface of the flanged end of the flanged member becomes deformed and warped. This problem is also common with small size flanges, having a rather small mass relative to the pipe shaped part of the flange member, and which therefore heat up rapidly. It is readily understood, that this circumstance does impair the performance of the joint tightness, which in many applications creates a most serious problem. Even a defect in the tightness that results in a very small leakage may, for instance, create a serious peril in cases when substances, which may endanger the environment, are transported in the pipe system.

SUMMARY OF THE INVENTION

Accordingly, the object of the present invention is to offer a solution to the above described problems. This is achieved by adjusting the respective masses of the pipe part and the flange part so that the mass of the pipe part is equal to at least 35% of the mass of the flange part, particularly 40% to 200% and more particularly 40% to 100% of the mass of the flange part as well as to a flanged member with those relative masses.

According to the present invention, a method for the manufacture of a flanged member for a pipe system is proposed, said flanged member comprising a radially projecting flange, forming a flange part, and further comprising a pipe part, said flange part having a front end surface adapted to be assembled with another element in the pipe system, and a rear end surface facing said pipe part, said rear end surface of the flange part being essentially plane in a radial direction and delimiting the flanged part at its rear end against the pipe part together with an extension of said rear end surface inwards, in the radial direction, and said pipe part having a free end adapted to be assembled with the pipe system, furthermore said flange part having a mass $M_f$ and said pipe part having a mass $M_p$, characterised in that, before the final machining of the front end surface of said flange part, the pipe part is given such a length (a) in the axial direction that its mass $M_p$ is equal to at least 35% of the mass $M_f$ of the flange part.

In practice, this means that the pipe part of the flanged member is made substantially longer than what is the standard practice, which leads to the advantageous result that, when the extended end of the pipe part is being welded to the pipe system, the heat transfer that results from the welding will not cause any substantial deformation of the contact surface of the flange. Thus, due to the extended pipe part, a substantial part, if not all, of the heat generated will be absorbed by the extended pipe part, such that the heat transferred to the end surface of the flange becomes drastically reduced. Another advantageous effect of the extended pipe part is that it will have a stiffening effect on the structure, which also contributes to considerable reduction of the peril of deforming of the end surface of the flange.

Regarding the length of the pipe part, this is adapted on a case to case basis, and there is not necessarily any upper limit, based on technical considerations, but in many cases it is guided by practical circumstances, for instance what space is available and such. Advantageously, the length (a) of the pipe part in the axial direction may be made long enough for its mass $M_p$ to be between 40% and 200% of the mass $M_f$ of the flange part. Preferably, the length (a) of the pipe part in the axial direction is such that its mass $M_p$ is between 40% and 100% of the mass $M_f$ of the flange part.

According to an advantageous embodiment, the entire pipe part is made in one piece with the other part(s) of the flanged member. In most cases this is the most practical way, if you already know beforehand that the flanged member will be exposed to heat transfer.

According to another advantageous embodiment, at least part of the pipe part is manufactured as a separate part, which is attached to the rest of the flanged member before final machining of the front end surface of the flange part. This has the advantage of ensuring flexibility in the manufacture. The separate extension part can be joined to the flanged member by welding, for example, which in itself may be expected to result in deformation of the contact surface. By making such an extension, according to the above invention, before the final machining of the contact surface of the flange end, i.e. the end surface, any possible deformation of the contact surface will become corrected during the final machining operation, which also offers a substantial benefit.

The object of the present invention is also achieved by means of a flanged member manufactured according to the inventive method.

The inside diameters of flanged members and of attached pipes are presumed to be essentially constant.

BRIEF DESCRIPTION OF THE DRAWING

The present invention will now be described in more detail with reference being made to the attached drawing, FIG. 1, and its schematic illustration of one embodiment, which is to be regarded only as a non-limiting example:

FIG. 1 shows schematically a flanged member, in an axial cross-section, in accordance with the present invention.

DESCRIPTION OF A PREFERRED EMBODIMENT

The flanged member 1, illustrated in FIG. 1, displays one end provided with a flange 3 or ring-shaped collar, and forming a flange part 2, and a non-flanged end 5 forming a pipe part 4. The flange part 2 has a front end surface or contact surface 7, intended for abutting against a corresponding surface of a pipe element, of a similar flanged member, or of some other type of component constituting a part of a pipe system. The flange part 2 also has a rear end surface 6 that is essentially plane and, in the illustrated case, principally at a right angle relative to the centre axis of symmetry of the flanged member. The flange 3 has through-bores 8 such that at assembly, the flanged member is bolted together with another flanged member or component, by means of bolts inserted in said bores. Normally there are a number of bores, equally spaced around the flange. All the way through the centre of the flanged member, there is a cylindrical duct 10.

The flanged member is normally connected to the pipe system, in which it is to become a part, by welding the non-flanged end 5 to the pipe system. In accordance with the solution proposed by the present invention, the non-flanged end 5 shall be located such a long distance from the delicate front contact surface 7, that the flange part 2 is not affected by any heating resulting from the welding, or at least is not affected to such a degree that the front contact surface is affected in its turn, and becomes warped or affected in any other negative way. The transfer of heat, taking place between the pipe part and the flange part, primarily is a function of their respective masses. For this purpose, the flanged part 2 is regarded as delimited against the pipe part 4 by a plane 9, which is formed by the extension inwards, in essentially the radial direction, of the plane that is formed by the rear end surface 6 of the flanged part. It follows, that the mass $M_f$ of the flange part 2 may be calculated as being the mass in front of or to the left of the line/plane 9 in FIG. 1, while the mass $M_p$ of the pipe part may be calculated as being the mass behind or to the right of the line/plane 9 in FIG. 1. Based on analysis and experiments supporting the present invention, it has been concluded that the pipe part shall have a length (a), as measured from the rear end surface 6 of the flange part to the end 5 of the pipe part, being long enough for its mass $M_p$ to be equal to at least 35% of the mass $M_f$ of the flange part.

Since it occurs that cylindrical pipe extensions are welded to a flanged member that has already been finally machined, its front end surface 7 then risking deformation due to the influx of heat, it is very important that the pipe part has been given the concerned proper length (a) before any final machining of the flanged member and, in particular, of its front end surface 7.

The pipe part 4 may be given the concerned length (a) directly at manufacture, or by the joining of an extension to the non-flanged end before the final machining operation.

In the embodiment illustrated in FIG. 1, there is an extension in the form of a separate part 15, provided in accordance with the present invention. The purpose of the extension 15 also is to increase the rigidity of the entire flanged member, which also contributes in a positive manner to prevent deformation of the end surface 7 of the flange part 2, when the flanged member is being joined to a pipe system by welding. It is understood that an extension made in one piece with the flanged member does have the same function.

In FIG. 1, the transit-zone 12 between the flange and the non-flanged end is illustrated as a zone having an elliptic form, which is already known per se. It deserves being noted, that the rear end surface 6 of the flanged member does not necessarily need to be at a right angle relative to the axial direction of the flanged member, but the rear end surface may alternatively be slightly inclined, which is also known per se.

The present invention shall not be considered as being limited to the illustrated embodiment, given as an example only, but may be varied and modified in numerous ways, as is readily understood by the person skilled in the art, within the scope of the appended patent claims.

The invention claimed is:

1. A method for manufacture of a flanged member for a pipe system included in pressure equipment, the flanged member including a radially projecting flange part and a pipe part, the flange part having a front face and a rear face and the pipe part having a first end and a free end located opposite the first end, the front face having a contact surface operable to be assembled with a first part of the pipe system, the rear face of the flange part extending radially inwardly and merging with the first end of the pipe part delimiting the flange part at its rear end, the free end of the pipe part being operable to be welded to a second part of the pipe system, and the flange part having a mass $M_f$ and the pipe part having a mass $M_p$, the method comprising the steps of:
    machining the flanged member; and
    prior to final machining of the front face of the flange part, restricting the pipe part to an axial length (a) selected such that the mass $M_p$ of the pipe part is equal to at least 35% of the mass $M_f$ of the flange part so as to substantially eliminate distortion of the contact surface on the front face of the flange part upon welding of the free end of the pipe part.

2. A method according to claim 1, wherein the axial length (a) is selected such that the mass $M_p$ of the pipe part is between 40% and 200% of the mass $M_f$ of the flange part.

3. A method according to claim 1, wherein the axial length (a) is selected such that the mass $M_p$ of the pipe part is between 40% and 100% of the mass $M_f$ of the flange part.

4. A method according to claim 1, further comprising forming the pipe part in one piece with the rest of the flanged member.

5. A method according to claim 1, wherein at least a portion of the pipe part is made as a separate part, which is attached to the rest of the flanged member before the final machining of the front face of the flange part.

6. A method for manufacture of a flanged member for a pipe system included in pressure equipment the flanged member including a radially projecting flange part and a pipe part, the flange part having a front face and a rear face and the pipe part having a first end and a free end located opposite the first end, the front face having a contact surface operable to be assembled with a first part of the pipe system, the rear face of the flange part extending radially inwardly and merging with the first end of the pipe part delimiting the flange part at its rear end, the free end of the pipe part being operable to be welded to a second part of the pipe system, and the flange part having a mass $M_f$ and the pipe part having a mass $M_p$, the method comprising the steps of:

machining the flanged member such that the pipe part includes a portion having a substantially constant outer diameter and a predominantly elliptical transit zone extending from the rear face of the flange part to the substantially constant diameter portion of the pipe part;

providing the flange part with a plurality of through-bores extending from the rear face to the front face; and prior to final machining of the front face of the flange part, restricting the pipe part to an axial length (a) selected such the mass $M_p$ of the pipe part is equal to at least 35% of the mass $M_f$ of the flange part so as to substantially eliminate distortion of the contact surface on the front face of the flange part upon welding of the free end of the pipe part.

7. A flanged member for use in a pipe system included in pressure equipment, the flanged member comprising:

a flange part having a mass $M_f$, a front end with a front face and a rear end with a rear face, the front face forming a contact surface operable to be assembled with a first part of the pipe system, the rear face extending radially inwardly; and a pipe part having a mass $M_p$, a first end and a free end located opposite the first end, the first end of the pipe part merging with the rear face of the flange part delimiting the rear end of the flange part, the free end being operable to be welded to a second part of the pipe system, wherein before final machining of the front face of the flange part, the pipe part has an axial length (a) selected such that the mass $M_p$ of the pipe part is equal to at least 35% of the mass $M_f$ of the flange part so as to substantially eliminate distortion of the front face of the flange part upon welding of the free end of the pipe part.

8. A flanged member according to claim 7, wherein the axial length (a) of the pipe part is selected such that the mass $M_p$ is between 40% and 200% of the mass $M_f$ of the flange part.

9. A flanged member according to claim 8, wherein the axial length (a) of the pipe part is selected such that the mass $M_p$ is between 40% and 100% of the mass $M_f$ of the flange part.

10. A flanged member according to claim 7, wherein the entire pipe part is made in one piece together with the rest of the flanged member.

11. A flanged member according to claim 7, wherein at least a part of the pipe part is a separate part, which is attached to the rest of the flanged member prior to final machining of said front face of the flange part.

12. A flanged member according to claim 7, wherein the pipe part comprises a portion having a substantially constant outer diameter and a predominantly elliptical transit zone located between the flange part and the portion of the pipe part that has the substantially constant outer diameter.

13. A flanged member according to claim 12, further comprising a plurality of through-bores extending from the rear face of the flange part to the front face thereof.

14. A flanged member according to claim 12, wherein the rear face of the flange part is substantially planar, and substantially parallel to the front face.

15. A flanged member according to claim 7 which is one half of a flanged pipe joint.

16. A flanged member according to claim 7, further comprising a plurality of through-bores extending from the rear face of the flange part to the front face thereof.

17. A flanged member according to claim 7, wherein the contact surface forms a seal with a complementary element of the first part of the pipe system, without an intermediate seal.

* * * * *